UNITED STATES PATENT OFFICE.

WALTER A. JACOBS, OF MOUNT VERNON, WADE H. BROWN, OF FLUSHING, MICHAEL HEIDELBERGER AND LOUISE PEARCE, OF NEW YORK, N. Y., ASSIGNORS TO THE ROCKEFELLER INSTITUTE FOR MEDICAL RESEARCH, OF NEW YORK, N. Y., A CORPORATION OF NEW YORK.

ARSENICAL COMPOUND.

1,315,127. Specification of Letters Patent. Patented Sept. 2, 1919.

No Drawing. Application filed June 13, 1918. Serial No. 239,771.

*To all whom it may concern:*

Be it known that we, WALTER A. JACOBS, Ph. D., residing at Mount Vernon, Westchester county, New York; WADE H. BROWN, M. D., residing at Flushing, in the city of New York, borough of Queens, Queens county, New York; MICHAEL HEIDELBERGER, Ph. D., residing in the city of New York, borough of Manhattan, county and State of New York, and LOUISE PEARCE, M. D., residing in the city of New York, borough of Manhattan, county and State of New York, all citizens of the United States, have jointly invented a new and Improved Arsenical Compound, of which the following is a specification.

In our Patent No. 1,280,123, September 24, 1918, of which this application forms a continuation in part, we have described and claimed a new class of products, of use in the treatment of trypanosomal and spirochætal infections, which products may be generally described as N-(arsenoaryl)-bis-α-aminoacylarylamins, in which the arylamin nucleus carries an attached salt-forming substituent. We have further found that a new class of substances, obtained by the combination of a fixed alkali with an N-(arsenoaryl)-bis-α-aminoacylarylamin containing an attached salt-forming substituent is likewise of great value in the treatment of trypanosomal or spirochætal infections.

This new class of substances may be prepared in the following manner:

The substances described in our patent No. 1,280,123, September 24, 1918, by virtue of their possession of hydroxyl groups (OH), are soluble in equivalent amounts of alkali solutions, such as sodium hydroxid, potassium hydroxid, and the like. It has now been found that by removing the water from such solutions by the usual methods, such as evaporation, preferably under reduced pressures at a low temperature, or by mixing such solutions with a suitable water-miscible solvent, such as acetone, alcohol and the like, the salts of this compound can be obtained. The sodium salt obtained in these ways is easily soluble in water and can be easily handled, thus rendering it particularly suitable for practical therapeutic purposes.

*Example I.*

10 grams of N(*p*-arsenophenylglycin)-bis-*m'*-hydroxyanilid are dissolved in 32 cc. of four per cent. sodium hydroxid solution. The solution is concentrated at low temperature under reduced pressure in a suitable apparatus. The dry sodium salt remains as a shellac-like mass which is easily powdered. As so obtained the sodium salt forms a dry yellow powder which is very easily soluble in water.

*Example II.*

10 grams of N(*p*-arsenophenylglycin)-bis-*m'*-hydroxyanilid are dissolved in 32 cc. of four per cent. sodium hydroxid solution. This solution is thinned with dry acetone as long as the mixture remains clear. This mixture is poured, with stirring, into 500 cc. of dry acetone, causing the separation of the sodium salt as an almost solid mass. The acetone is decanted off and the residue again treated with a smaller volume of dry acetone. The sodium salt hardens completely and after decanting the acetone it can be readily powdered and dried *in vacuo*.

The sodium salt obtained in this way also forms a dry yellow powder which is easily soluble in water. For preservation the sodium salt obtained by either of these methods is preferably kept in vacuum ampuls or in ampuls containing an inert non-oxidizing gas.

The sodium salt may also be prepared by mixing an alcoholic solution of the above-described arsenical compound with an alcoholic sodium hydroxid solution.

It is obvious that many variations and modifications may be made within the class of substances herein described and claimed, without departing from the spirit and scope of our invention.

What we claim is:

1. As a new product, an alkali metal salt of an N-(arsenoaryl)-bis-α-aminoacylarylamin, in which the arylamin nucleus carries an attached salt-forming substituent, substantially as described.

2. As a new product, an alkali metal salt of an N-(arsenoaryl)-bis-glycylarylamin, in which the arylamin nucleus carries an attached salt-forming substituent, substantially as described.

3. As a new product, an alkali metal salt of an N-(arsenoaryl)-bis-glycyloxyarylamin.

4. As a new product, an alkali metal salt of an N-(arsenophenyl)-bis-glycyl-$m'$-amino-phenol.

5. As a new product, an alkali metal salt of N-($p$-arseno-phenyl)-bis-glycyl-$m'$-aminophenol, otherwise more shortly expressed as $p$-arsenophenylglycin-bis-$m'$-oxyanilid, having the formula:

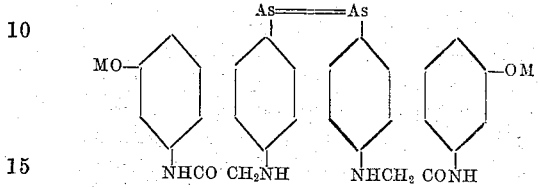

in which M is the alkali metal.

6. As a new product, an alkali metal salt of an N-(arsenoaryl)-bis-α-aminoacylarylamin, in which the aryl nuclei carry an attached salt-forming substituent, substantially as described.

7. As a new product, the sodium salt of an N-(arsenoaryl)-bis-α-aminoacylarylamin, in which the arylamin nucleus carries an attached salt-forming substituent, substantially as described.

8. As a new product, the sodium salt of an N-(arsenoaryl)-bis-glycylarylamin, in which the arylamin nucleus carries an attached salt-forming substituent, substantially as described.

9. As a new product, the sodium salt of an N-(arsenoaryl)-bis-glycyloxyarylamin.

10. As a new product, the sodium salt of an N-(arsenophenyl)-bis-glycyl-$m'$-aminophenol.

11. As a new product, the sodium salt of N-($p$-arseno-phenyl)-bis-glycyl-$m'$-aminophenol, otherwise more shortly expressed as $p$-arsenophenylglycin-bis-$m'$-oxyanilid, having the formula:

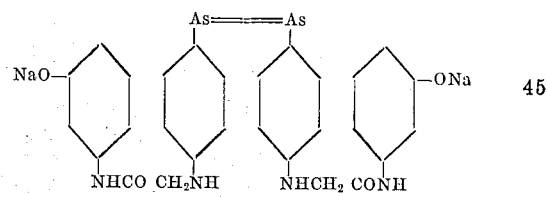

12. As a new product, the sodium salt of an N-(arsenoaryl)-bis-α-aminoacylarylamin, in which the aryl nuclei carry an attached salt-forming substituent, substantially as described.

WALTER A. JACOBS, Ph. D.
WADE H. BROWN, M. D.
MICHAEL HEIDELBERGER, Ph. D.
LOUISE PEARCE, M. D.